Dec. 9, 1952　　　　　　　　M. G. BALES　　　　　　　　2,620,640
FLEXIBLE COUPLING

Filed Oct. 3, 1945　　　　　　　　　　　　　　　　　3 Sheets-Sheet 1

INVENTOR.
MAX G. BALES
BY
Spencer, Hardman & Faber
His ATTORNEYS

Dec. 9, 1952　　　　　　　M. G. BALES　　　　　　　2,620,640
FLEXIBLE COUPLING
Filed Oct. 3, 1945　　　　　　　　　　　　　　　　3 Sheets-Sheet 2

INVENTOR
MAX G. BALES
BY
Spencer, Hardman & Fehr
HIS ATTORNEYS

Dec. 9, 1952 M. G. BALES 2,620,640
FLEXIBLE COUPLING
Filed Oct. 3, 1945 3 Sheets-Sheet 3

INVENTOR
MAX G. BALES
BY
Spencer, Hardman & Fehr
His ATTORNEYS

Patented Dec. 9, 1952

2,620,640

UNITED STATES PATENT OFFICE 2,620,640

FLEXIBLE COUPLING

Max G. Bales, Anderson, Ind., assignor to General Motors Corporation, Detroit, Mich., a corporation of Delaware Application October 3, 1945, Serial No. 619,958

10 Claims. (Cl. 64—14)

This invention relates to the art of absorbing torsional vibrations in rotary drives.

This application is a continuation in part of Serial No. 511,057, filed November 20, 1943, now abandoned.

An object of the present invention is to provide a vibration-absorbing rotary drive of durable construction capable of being produced at low cost.

A further object is to provide a drive of the type referred to which can easily be adapted for use in installations having shafts out of alignment as well as in alignment. This object is accomplished by having in combination a preformed resilient vibration-absorbing element comprising two opposite annular segments connected by two opposite channel portions each having parallel sides; a first member having opposite lugs received by the channel portions; a second member having opposite recesses receiving the channel portions with the lugs of the first member within said channel portions; a sleeve surrounding the element and members and having inwardly extending flanges at each end thereof, each flange loosely overlapping a portion of one of the members to limit axial separation of the members, said sleeve limiting radial extension outwardly of the element, while allowing freedom of relative rotary motion between the members; and a cylindrical body fitting within a central bore of at least one of the members and operating to limit radial extension inwardly of the element.

Further objects and advantages of the present invention will be apparent from the following description, reference being had to the accompanying drawings wherein preferred embodiments of the present invention is clearly shown.

In the drawings:

Fig. 1 is a longitudinal sectional view of the form of coupling embodying the present invention, the coupling illustrated being drawn on an enlarged scale.

Figs. 2 and 3 are end views looking in the direction of arrows 2 and 3, respectively of Fig. 1.

Figure 7:
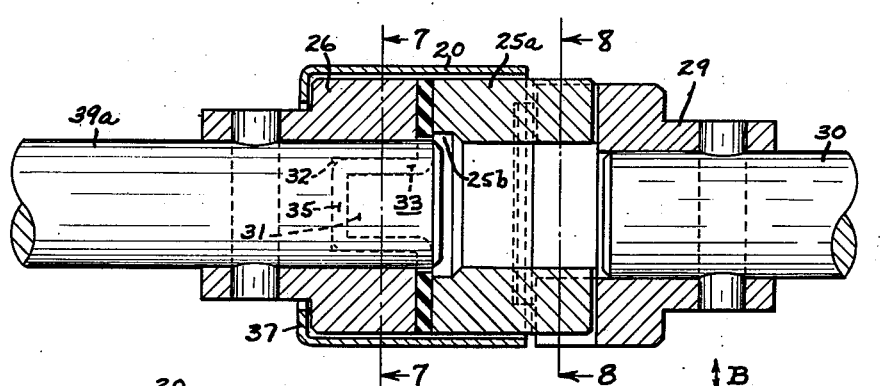
Fig. 7 shows a longitudinal axial sectional view through another modified form of the invention in which the coupling member is attached to one shaft and connected with a coupler fixed to another shaft which is out of alignment with the first shaft.
Figure 8:
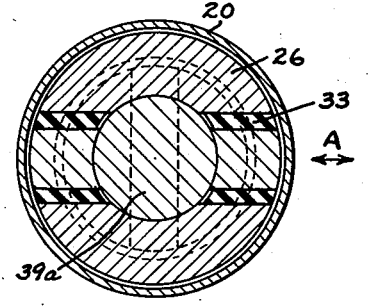
Figure 9:
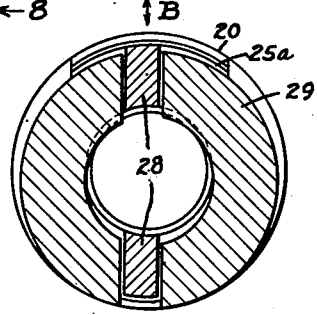

Figs. 8 and 9 are sectional views taken on lines 7—7 and 8—8 respectively of Fig. 7.

Figure 10:
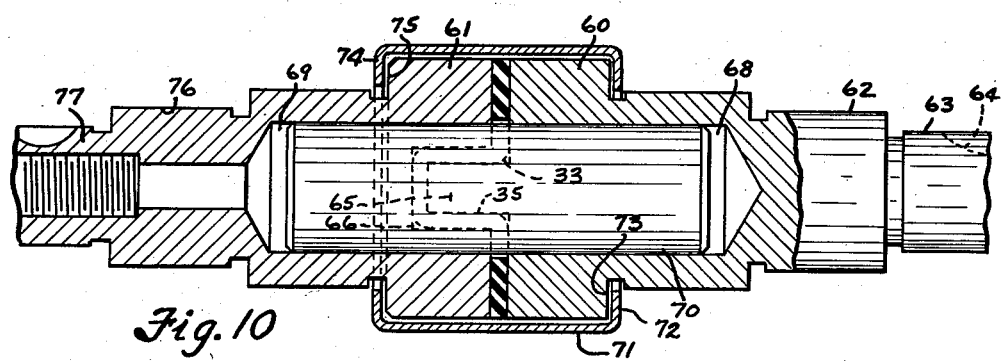

Fig. 10 shows a longitudinal axial sectional view through another modified form of the invention in which a cylindrical body is enclosed by the coupling members.

Figure 11:
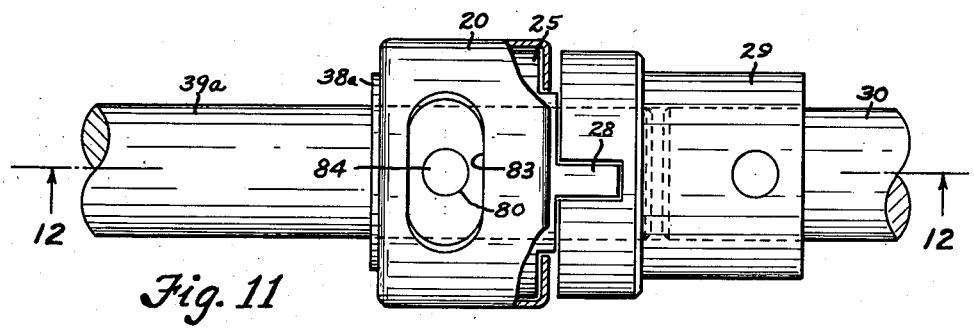

Fig. 11 is an elevation of another form of coupling embodying the features of the present invention.

Figure 12:
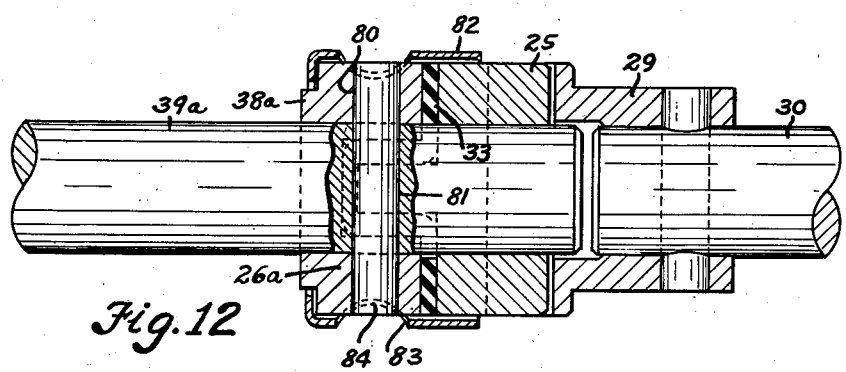

Fig. 12 is a sectional view taken on line 12—12 of Fig. 11.

The form of the invention shown in Figs. 1 to 5 inclusive comprises a sleeve or retainer member 20 having inturned flanges 21 and 22 at one end thereof to form a non-rounded opening 23. A pair of bored metallic members 25 and 26 are embraced by the sleeve 20. The inner surface of the sleeve is spaced from the members 25 and 26 the purpose of which will be described hereinafter. The member 25 is provided on one end thereof with a non-rounded boss or projection 27, see Fig. 3, which projects through the non-rounded opening 23. A pair of opposite tongues 28, formed integral with the boss, extends longitudinally with reference to the axis of the member 25. These tongues fit into a pair of opposite grooves provided in a drive coupling part 29 shown in dot-and-dash lines. The coupling part 29 is attached to a shaft 30 by a pin which is driven by any suitable means. The non-rounded boss 27 extends beyond the outer surfaces of the flanges 21 and 22 in order to take care of any end thrusts imparted to the member 25. By this arrangement the part 29 will not contact any portion of the sleeve 20 to damage or mar same.

The other end of the member 25 is formed with opposite integral lugs 31 which extend longitudinally of the axis thereof. The lugs 31 are adapted to intermesh loosely with opposite recesses 32 cut in the end face of the other member 26 to provide opposite jaws on the member 26. Power is transmitted between the lugs and jaws of the opposite members 25, 26 by a vibration-absorbing element 33 comprising two opposite annular segments 34 connected by two opposite channel portions 35, each having parallel sides. This vibration-absorbing element is disposed between the members 25 and 26 with the annular segments 34 between the end faces of the members and the channel portions 35 between the recesses and lugs carried by the members so that when the member 25 is driven by the drive member 29 power is transmitted through the sides to the jaws of the member 26. The member 26 has a hub 38 which may be keyed or pinned to a cylindrical body or shaft 39, shown in dot-and-dash lines. The channel portion 35 of the element 33 fits snugly within the recesses 32 and the lugs 31 fit snugly within the channel portions 35. In order to restrain the resilient member against radial inward movement the cylindrical body or shaft 39 extends through bores provided by the members 26 and 25 and extends a short distance into the driving part 29 which is driven by any suitable means not shown.

The vibration-absorbing element 33 is preferably preformed by a molding operation and is preferably composed of soft rubber-like material, such as synthetic rubber of relative high hysteria so that it is capable of absorbing the vibrations of the driving part 29. The composition of the resilient member is such that it is impervious to oils, aromatic gasoline or the like. This is important especially if the coupling is so positioned as to operate in crank case oil of an internal combustion engine. Further the rubber-like material should be made of a composition so that it will not be affected by temperature up to 180° Fahrenheit.

For the purpose of limiting the axial separation of the members 25 and 26 and also for limiting the radial outward movement of the resilient member the sleeve 20 is bent inwardly as at 37. The bent over end 37 is spaced slightly from a shoulder provided by the member 26 so that the members 25 and 26 will have some freedom of axial and lateral movement. In case the shaft 30 and the cylindrical body 39 are out of alignment the pilot end of the shaft 39 will extend into the enlarged portion 40 provided by the part 29. The cross dimension of the portion 40 is such that the end will not contact the part 29. Thus the pilot end of the shaft 39 is free to rotate about its axis in a manner to allow for any slight misalignment of the shaft 30 and the cylindrical body 39.

In Figs. 7, 8 and 9 of the drawings there is shown another form of the invention which is identical with that shown in Figs. 1 to 5 inclusive except that the shaft 39a is shorter and the member 25a is provided with an enlarged bored portion 25b. The other elements shown in Figs. 7, 8 and 9 are the same in construction as shown in Figs. 1 to 5 inclusive, and have been identified with the same numbers. In the form shown in Figs. 7, 8 and 9 a cylindrical body or the shaft 39a extends through the member 26 and only a short distance into bore 25b of the member 25a. The body 39a limits the radial extension inwardly of the resilient member 33 while the bored portion 25b permits slight misalignment of the members 26 and 25a. In Fig. 9 of the drawings there is illustrated upon a rather exaggerated scale, the relative positions of the elements of the coupling shown in Fig. 7 when the body 39a and shaft 30 are out of alignment.

Figure 1:
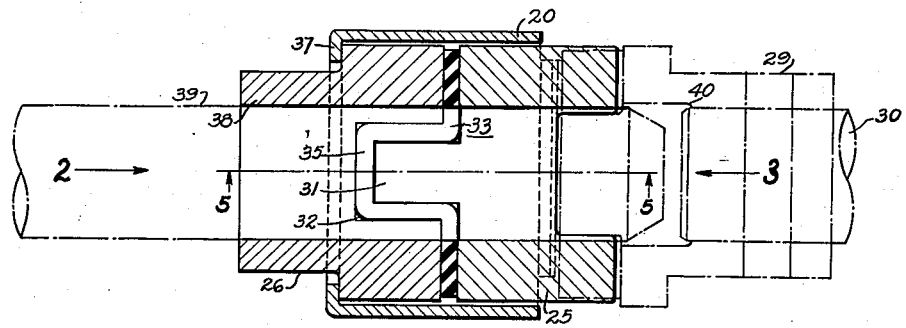
Figure 2:
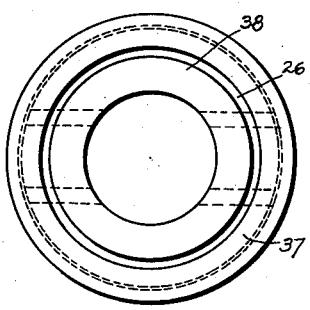
Figure 4:
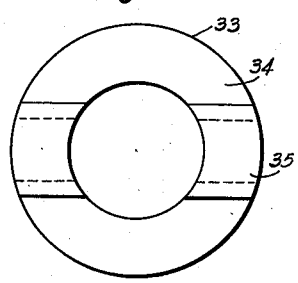
Fig. 4 is a plan view of the cushioning element disposed between a pair of apertured members and looking in the direction of arrow 2 of Fig. 1.
Figure 3:
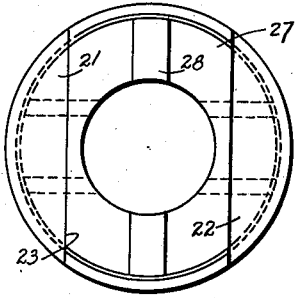
Figure 5:
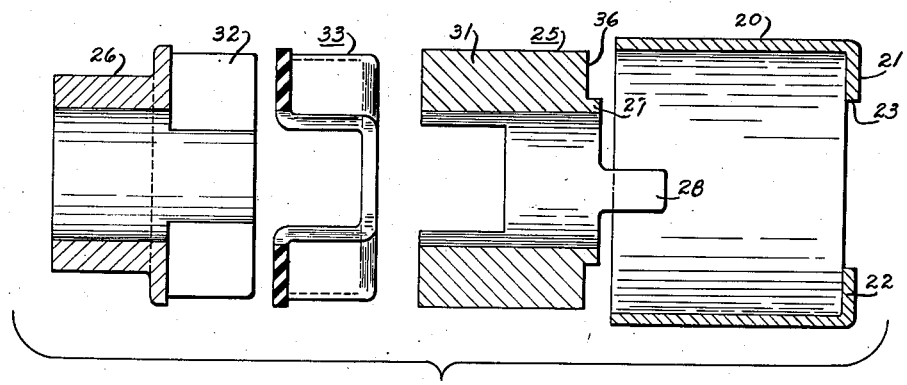
Fig. 5 is a longitudinal sectional view with the elements in extended relation in their manner of assembly, the section of the elements being taken along line 5—5 of Fig. 1.
Figure 6:
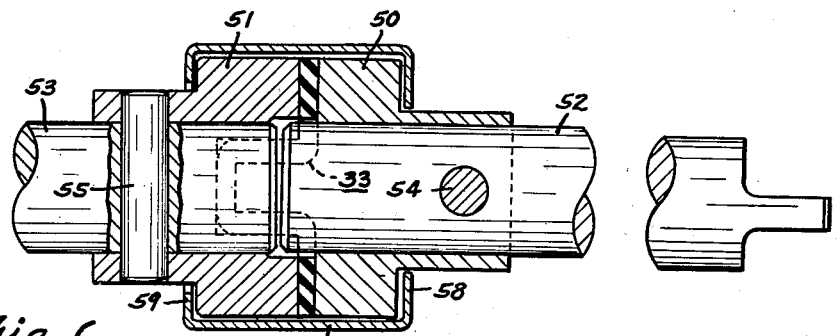
Fig. 6 shows a longitudinal axial section through a modified form of the invention in which each coupling member is attached to a separate shaft and showing one shaft out of alignment with the other shaft.

In Fig. 6 there is illustrated a third form of the invention, the coupling comprises the same principal elements as set forth for the couplings heretofore described but is distinguished therefrom in that both members 50 and 51 are connected separately to shafts 52 and 53 respectively by pins 54 and 55 respectively. The resilient member 33 in this instance is prevented from moving radially inwardly by both shafts 52 and 53 and radially outwardly by a sleeve 57. This sleeve has its opposite ends bent inwardly as at 58 and 59 to limit axial separation of the members 52 and 53, and when the ends are bent over as shown a unitary coupling member is provided.

It will be noted from the elements of the rotary drives shown in Figs. 1 to 9 inclusive that the tongues 28 and lugs 31 formed on opposite ends of member 25 are arranged at right angles. Thus should the axes of the shafts 30 and 39, which are in parallel, be out of alignment the member 25 will float to compensate for the misalignment of the parts 30 and 39 by sliding movements of the lugs and tongues in their respective recesses as indicated by arrows A and B in Figs. 8 and 9 respectively.

In Fig. 10 of the drawings there is shown another modified form of the invention in which different constructed members are provided and different means are employed for limiting radial extension inwardly of the resilient member 33. This modified form of the invention comprises a pair of members 60 and 61. The coupling member 60 is provided at one end with suitable journal 62 and a portion 63 having a recess 64 for receiving a key by which said member may be connected with a drive member, not shown. The member 60 is provided with axially extending opposite lugs 65 at the other end. The lugs loosely intermesh with opposite notches 66 formed in the other member 61. A resilient vibration-absorbing member 33 is located between the members with the channel portions 35 having a snug fit with the recesses 66. The members 60 and 61 are provided respectively with central recesses 68 and 69 for receiving one end of a cylindrical body or rod 70. The rod 70 operates to keep the couplings 60 and 61 in alignment and said rod also functions to limit radial extension inwardly of the resilient member 33. The coupling members are held in assembled relation by a sleeve 71 having each end thereof bent inwardly, the end 72 overlapping a shoulder 73 provided by the coupling member 60 while the end 74 is bent inwardly to overlap a shoulder 75 by the coupling member 61. The intermediate portion of the sleeve 71 operates to limit radial extension outwardly of the resilient member 33. It will be noted that the bent ends 72 and 74 are slightly spaced from the shoulders 73 and 75 to permit slight axial movement between the coupling members. The member 61 is provided with bearing portions 76 and a portion 77 having a slot to receive a key to connect same with a part, not shown, to be driven.

In Figs. 11 and 12 of the drawings there is illustrated a construction that is somewhat similar with that shown in Figs. 1 to 5 inclusive except that the coupling member 26a is provided with a short hub 38a and the portions between the notches are provided with openings 80 which align with an aperture 81 provided by the shaft 39a. In this construction a sleeve 82 is provided with an elongated opposite opening 83 through which a cross-pin 84 is forced into the openings 80 and 81 to connect the coupling member 26a with the shaft 39a. By this arrangement the longitudinal dimensions of the coupling are materially reduced.

While the embodiment of the present invention as herein disclosed, constitutes a preferred form, it is to be understood that other forms might be adopted, all coming within the scope of the claims which follow.

What is claimed is as follows:

1. A vibration-absorbing rotary drive comprising the combination of a preformed resilient vibration-absorbing element comprising two opposite annular segments connected by two opposite channel portions each having parallel sides; a first member having opposite lugs received by the channel portions; a second member having opposite recesses receiving the channel portions with the lugs of the first member within said channel portions; a sleeve surrounding the element and members and having inwardly extending flanges at each end thereof, each flange loosely overlapping a portion of one of the members to limit axial separation of the members, said sleeve limiting radial extension outwardly of the element while allowing freedom of relative rotary motion between the members; and a cylindrical body fitting within a central bore of at least one of the members and operating to limit radial extension inwardly of the element.

2. A drive according to claim 1 in which the cylindrical body is a shaft to which one of the members is attached.

3. A drive according to claim 1 in which the members are each integral with a shaft each having an axial bore and in which the cylindrical body fits the bores of the members to maintain axial alignment.

4. A drive according to claim 1 in which the cylindrical body is a shaft extending through and attached to one of the members and extending also through the other member, said other member providing tongues for engaging grooves in a shaft coupling part into which said shaft extends to pilot the same, whereby a shaft attached to said coupling part will be aligned with the shaft first mentioned.

5. A drive according to claim 1 in which the cylindrical body is a shaft extending through and attached to one of the members and extending also through the element, said other member providing tongues for engaging grooves in a shaft coupling part connected with a second shaft, said grooves extending at right angles to the channels of said element whereby the second mentioned combination of tongue and grooves cooperate with the first mentioned combination of lugs, channels and recesses to provide, in effect, an Oldham coupling to take care of misalignment of shafts which are substantially parallel.

6. A drive according to claim 1 in which the cylindrical body is a shaft extending through one of the members and attached thereto and extending also through the element and in which the other member is attached to a second shaft and provides a piloting recess for the end of the first shaft which extends beyond the element, the clearance between the end of the first shaft and the walls of the piloting recess and the clearance between the sleeve and the members being such as to permit angular misalignment of the shafts, said element yielding axially of the shafts in consequence of relative wobble-motion between said members.

7. In combination, a pair of coupling members wherein one of the members is fixed to a shaft while the other member has a free sliding fit with the shaft, each member being provided with tongues and recesses for interlocking engagement with the tongues and recesses of the other member the interlocking joints being spaced apart; shock-absorbing means disposed in the spaces between the tongues and recesses and surrounding the shaft, said shaft limiting radial inward movement of the shock absorbing means; and sleeve means loosely surrounding the shock-absorbing means and the members and having spaced inwardly extending portions at its ends, each portion cooperating with a portion of one of the members to limit axial separation of the members, said sleeve also limiting radial outward movement of the shock absorbing means.

8. In combination, a pair of coupling members wherein one member is fixed to a shaft while the other member has a free sliding fit with the shaft, each member being provided with tongues and recesses for interlocking engagement with the tongues and recesses of the other member the interlocking joints being spaced apart; a one-piece shock-absorbing element about the shafts and disposed between the members to fill substantially all the spaces between the tongues and recesses, said shafts limiting radial inward movement of the element; a sleeve loosely surrounding the element and the members; and provisions provided by the sleeve and members to hold the members in assembled relation and for limiting axial separation of the members, said sleeve also limiting radial outward movement of the element.

9. A unitary flexible coupling comprising; a pair of separate bored coupling members adapted to be telescoped over a drive or driven shaft and having one of said members fixed to said shaft, and having the other member movable on the shaft, said members having tongues and grooves for loose interlocking engagement with the tongue and grooves of the other member, to provide spaces therebetween; a preformed shock-absorbing element surrounding the shaft and interposed between the members and contacting the surfaces of the tongues and grooves, said shaft limiting radial inward movement of the element; a retainer member loosely surrounding the shock-absorbing element and the members and having inturned flanges at each end thereof engaging the outer faces of respective members for maintaining the movable member in position and also for limiting axial separation of the members, said retainer member also limiting radial outward movement of the shock-absorbing element.

10. In combination, a shaft; a pair of coupling members mounted on the shaft, one of said members being fixed to the shaft while the other member has a free sliding fit, said members having intermeshed lugs provided with straight sides arranged in driving relation and having a substantial clearance with respect to each other; yielding means between the members and substantially filling the substantial clearance therebetween for forming a shock absorbing driving connection between the two members; a sleeve surrounding the members, said sleeve having inturned flanges at each end thereof overlying shoulders provided by the members to hold the members in assembled relation yet permitting the free member to move axially on the shaft.

MAX G. BALES.

REFERENCES CITED

The following references are of record in the file of this patent:

UNITED STATES PATENTS

| Number | Name | Date |
|---|---|---|
| 1,463,396 | Kratz | July 31, 1923 |
| 1,623,857 | Teel | Apr. 5, 1927 |
| 2,105,702 | Scholtze | Jan. 18, 1938 |
| 2,140,255 | Rieske | Dec. 13, 1938 |
| 2,220,622 | Homer | Nov. 5, 1940 |